United States Patent [19]

Devore et al.

[11] Patent Number: 5,189,142

[45] Date of Patent: Feb. 23, 1993

[54] WET STRENGTH RESIN COMPOSITION AND METHOD OF MAKING SAME

[75] Inventors: David I. Devore, Langhorne; Stephen A. Fischer, Yardley, both of Pa.

[73] Assignee: Henkel Corporation, Ambler, Pa.

[21] Appl. No.: 573,600

[22] Filed: Aug. 24, 1990

[51] Int. Cl.$^5$ .................... C08G 69/26; C08G 69/34
[52] U.S. Cl. .................... 528/339.3; 428/411.1; 524/35; 524/800
[58] Field of Search ............ 428/411.1; 524/35, 800; 528/339.3

[56] References Cited

U.S. PATENT DOCUMENTS

| | | | |
|---|---|---|---|
| 2,926,116 | 2/1960 | Keim | 162/164 |
| 3,049,469 | 8/1962 | Davison | 162/164 |
| 3,058,873 | 10/1962 | Keim et al. | 162/164 |
| 3,066,066 | 11/1962 | Keim et al. | 162/152 |
| 3,111,594 | 11/1963 | Stolte | 307/110 |
| 3,125,552 | 3/1964 | Loshaek et al. | 260/78 |
| 3,186,900 | 6/1965 | DeYoung | 162/164 |
| 3,197,427 | 7/1965 | Schmalz | 260/29.2 |
| 3,224,986 | 12/1965 | Butler et al. | 260/9 |
| 3,224,990 | 12/1965 | Babcock | 260/29.2 |
| 3,227,615 | 1/1966 | Korden | 167/87.1 |
| 3,227,671 | 1/1966 | Keim | 260/29.2 |
| 3,239,491 | 3/1966 | Tsou et al. | 260/78 |
| 3,240,761 | 3/1966 | Keim et al. | 260/78 |
| 3,248,280 | 4/1966 | Hyland | 162/164 |
| 3,250,664 | 5/1966 | Conte et al. | 162/164 |
| 3,324,280 | 6/1967 | Cheney et al. | 219/544 |
| 3,329,657 | 7/1967 | Strazdins et al. | 260/78 |
| 3,332,834 | 7/1967 | Reynolds | 162/164 |
| 3,332,901 | 7/1967 | Keim | 260/29.2 |
| 3,352,833 | 11/1967 | Earle | 260/78 |
| 3,442,754 | 5/1969 | Espy | 162/164 |
| 3,459,697 | 8/1969 | Goldberg et al. | 260/29.2 |
| 3,483,077 | 12/1969 | Aldrich | 162/158 |
| 3,609,126 | 9/1971 | Asno et al. | 260/78 |
| 4,714,736 | 12/1987 | Juhl et al. | 524/608 |

FOREIGN PATENT DOCUMENTS

| | | |
|---|---|---|
| 335158 | 3/1989 | European Pat. Off. . |
| 332967 | 9/1989 | European Pat. Off. . |
| 335157 | 10/1989 | European Pat. Off. . |
| 1906561 | 2/1968 | Fed. Rep. of Germany . |
| 2938588 | 4/1981 | Fed. Rep. of Germany . |
| 3323732 | 1/1985 | Fed. Rep. of Germany . |
| 36237 | 5/1967 | Finland . |
| 1522583 | 10/1967 | France . |
| 7027833 | 12/1966 | Japan . |
| 7108875 | 2/1967 | Japan . |
| 7136485 | 3/1967 | Japan . |
| 7112083 | 11/1968 | Japan . |
| 7112088 | 11/1968 | Japan . |
| 6410230 | 3/1965 | Netherlands . |
| 6805823 | 9/1967 | South Africa . |
| 210023 | 12/1966 | Sweden . |
| 1073444 | 9/1963 | United Kingdom . |
| 1218394 | 3/1967 | United Kingdom . |

OTHER PUBLICATIONS

Wochenblatt fuer Papierfabrikation, vol. 2, pp. 63–67, 1989 (translation).

*Primary Examiner*—John Kight, III
*Assistant Examiner*—T. Mosley
*Attorney, Agent, or Firm*—Ernest G. Szoke; Wayne C. Jaeschke; John E. Drach

[57] ABSTRACT

A wet strength resin composition is comprised of an aminopolyamide-epichlorohydrin acid salt resin having a total organic chlorine of up to about 0.1% by weight of the resin. The amount of total organic chlorine present is controlled by the process parameters.

20 Claims, No Drawings

WET STRENGTH RESIN COMPOSITION AND METHOD OF MAKING SAME

BACKGROUND OF THE INVENTION

1. Field of the Invention

This invention relates to wet strength resin compositions for paper and a method for making them.

2. Description of the Related Art

Aminopolyamide-epichlorohydrin resins were the first commercially significant neutral-to-alkaline curing wet strength resins for paper. In addition to the health and safety benefits that result from the resins being formaldehyde-free, their use also affords such benefits as reduced paper-machine corrosion and improved softness and absorbency in treated webs compared to urea-formaldehyde-treated webs. U.S. Pat. No. 2,926,116 teaches high wet strength paper is obtained by treating paper pulp with a water-soluble polymeric reaction product of epichlorohydrin and a polyamide derived from a polyalkylenepolyamine and a dicarboxylic acid having from 3 to 10 carbon atoms. Other patents teaching the preparation and/or use of aminopolyamide-epichlorohydrin resins in wet strength applications for paper include U.S. Pat. Nos. 2,926,154; 3,049,469; 3,058,873; 3,066,066; 3,125,552; 3,186,900; 3,197,427; 3,224,986; 3,224,990; 3,227,615; 3,227,671; 3,239,491; 3,240,761; 3,248,280; 3,250,664; 3,311,594; 3,329,657; 3,332,834; 3,332,901; 3,352,833; 3,248,280; 3,442,754; 3,459,697; 3,483,077; 3,609,126; 4,714,736; British patents 1,073,444 and 1,218,394; Finnish patent 36,237 (CA 65: 50543d); French patent 1,522,583 (CA 71:82835d); German patents 1,906,561 (CA 72: 45235h); 2,938,588 (CA 95: 9046t); 3,323,732 (CA 102: 151160c); Japanese patents 70 27,833 (CA 74: 4182m); 71 08,875 (CA 75: 49990k); 71 12,083 (CA 76: 115106a); 71, 12,088 (CA 76: 115107b); 71 36,485 (CA 77: 90336f); Netherlands application 6,410,230 (CA 63: P5858h); South African patent 68 05,823 (CA 71: 114420h); Swedish patent 210,023 (CA 70: 20755y).

One of the drawbacks associated with the use of aminopolyamide-epichlorohydrin wet strength resins is the emission of harmful chlorinated compounds into the water systems of pulp and paper mills. These chlorinated compounds, which are the by-products of the manufacture of the aminopolyamide-epichlorohydrin resins, have been identified as epichlorohydrin, 1,3-dichloro-2-propanol, and 3-chloro-1,2-propanediol. These chlorinated organics are usually discharged into effluent waste water systems from pulp and paper mills because they are not substantive to cellulose pulp fibers. Since permissible amounts of halogenated organics in waste waters is ever decreasing, considerable effort has been expended to reduce the amount of these materials in aminopolyamide-epichlorohydrin wet strength resins. For example, European Patent Application 335,158 teaches that wet strength resins having organic chlorine values of about 0.001% are obtained by reaction of an aminopolyamide with a glycidyl sulfonate. European Patent Application 332,967 teaches that wet strength compositions containing 15% by weight of aminopolyamide-epichlorohydrin resins having organic chlorine contents of about 0.16% by weight of total composition or 1.1% by weight of aminopolyamide-epichlorohydrin acid salt resin are obtained by adding epichlorohydrin to an aqueous solution of aminopolyamide at 25° C.-30° C. and then heating the reaction mixture to 75° C. for a period of time sufficient to increase the viscosity of a 15% solids solution to 55 MPa-s at 25° C. The moles of epichlorohydrin/amine equivalents weight (E/N, infra) of the composition is equal to about 1.0 European Patent Application 332,967 teaches an elevated epichlorohydrin reaction temperature of 75° C. as compared to from about 15° C. to about 25° C. according to the invention and an E/N ratio of about 1.0 as compared to from about 0.6 to about 0.8 according to the invention. The application does not teach or suggest that very low total organic chlorine levels are obtainable by lowering the epichlorohydrin reaction temperature and lowering the E/N ratio. European Patent Application 335,157 teaches an epichlorohydrin reaction temperature of 55° C. as compared to from about 15° C. to about 25° C. according to the invention and an E/N ratio of about 1.2 as compared to from about 0.6 to about 0.8 according to the invention. The composition produced by the disclosed process contains about 3.12% total organic chlorine based upon the weight of the aminopolyamide-epichlorohydrin acid salt resin. The application does not teach or suggest that very low total organic chlorine levels are obtainable by lowering the epichlorohydrin reaction temperature and lowering the E/N ratio. Wochenblatt für Papierfabrikation 2, 63–67 (1989) teaches that a modified aminopolyamide-epichlorohydrin resin has an absorbable organic halogens content 70% lower than conventional commercial products. The wet strength resin compositions according to the invention contain organic chlorine compounds in amounts which are at least 99% lower than commercial aminopolyamide-epichlorohydrin resins. Wochenblatt für Papierfabrikation 2, 63–67 (1989) neither identifies the modified aminopolyamide-epichlorohydrin resin nor teaches how to make it.

The related art does not teach wet strength resins compositions comprised of an aminopolyamide-epichlorohydrin acid salt resin and up to about 0.1% by weight total organic chlorine based on the weight of said resin. The related art also does not teach a relationship between the epichlorohydrin-aminopolyamide reaction time and very low total organic chlorine content in processes to make wet strength resins compositions comprised of an aminopolyamide-epichlorohydrin acid salt resins.

SUMMARY OF THE INVENTION

The present invention provides a wet strength resin composition comprising from about 1% to about 60% by weight of an aminopolyamide-epichlorohydrin acid salt resin, up to about 0.1% by weight total organic chlorine based on the weight of said resin, and the remainder water.

The present invention also provides a process for producing a wet strength resin composition comprising the steps of: (a) providing an aqueous solution of an aminopolyamide resin; (b) adding epichlorohydrin to said solution over a period of from about 10 minutes to about 200 minutes and at a temperature in the range of from about 5° C. to about 20° C. to form a reaction mixture having an E/N ratio of from about 0.6 to about 0.8; (c) maintaining the temperature of said reaction mixture in a range of from about 15° C. to about 25° C. until all of the epichlorohydrin has reacted; and (d) adjusting the pH of said reaction mixture to a value of up to about 7.0 to produce a wet strength resin composition comprised of an aqueous solution of an aminopolyamide-epichlorohydrin acid salt resin wherein said composition has a total organic chlorine of up to about 0.1% by weight of said resin.

The present invention further provides a cellulosic fibrous web comprising a wet strengthening effective amount of an aminopolyamide-epichlorohydrin acid salt resin and up to about 0.1% of total organic chlorine by weight of said aminopolyamide-epichlorohydrin acid salt resin.

DESCRIPTION OF THE PREFERRED EMBODIMENTS

One aspect of the present invention provides wet strength resin compositions for increasing the wet strength of cellulosic webs comprising from about 1% to about 60% by weight of an aminopolyamide-epichlorohydrin acid salt resin, up to about 0.1% by weight total organic chlorine based on the weight of said resin, and the remainder water.

The wet strength resin compositions according to the invention can be made by the process disclosed herein by reacting an aminopolyamide resin with epichlorohydrin over an extended period of time. Aminopolyamide resins are well known to those of ordinary skill in the art and can be made by reacting a dicarboxylic acid such as adipic acid with a polyamine which is a compound having at least two amine functionalities such as a simple diamine as ethylene diamine or more than two amine functionalities such as diethylenetriamine, triethylenetetramine, tetraethylenepentamine, and bis-hexamethylenetriamine and the like. An aminopolyamide can also be made by reacting a dicarboxylic acid ester such as dimethyl adipate with a polyamine. While any water soluble, water-miscible, or water-dispersable aminopolyamide can be used in the composition according to the invention, aminopolyamide resins wherein the dicarboxlyic acid component contains from 4 to 6 carbon atoms and the diamine component contains at least three amine functionalities are preferred. The most preferred aminopolyamide resins are those made by reacting adipic acid with diethylenetriamine, glutaric acid with diethylenetriamine, adipic acid with triethylenetetramine, glutaric acid with triethylenetetramine, or combinations of adipic, glutaric, and succinic acids with diethylenetriamine, or triethylenetetramine or combinations of diethylenetriamine and triethylenetetramine or any combination of all of the above. The aminopolyamide resin is dissolved in water to form a solution and then reacted with epichlorohydrin to form an aminopolyamide-epichlorohydrin resin. The pH of the solution is then adjusted to a value of up to about 7.0 by acidifying it with an acid, preferably an aqueous acid solution such as hydrochloric acid. An aminopolyamide-epichlorohydrin-acid salt resin is formed by reaction of the acid with the secondary and/or tertiary amines present in the aminopolyamide-epichlorohydrin polymer. The resulting wet strength resin composition contains up to about 0.1% by weight total organic chlorine based on the weight of the resin. The total organic chlorine is defined as the total weight of epichlorohydrin, 1,3-dichloro-2-propanol, and 3-chloro-1,2-propanediol. The total weight of any one or a combination of the above chlorinated compounds will be less than about 0.1% based on the weight of the aminopolyamide-epichlorohydrin acid salt resin. The wet strength resin compositions according to the invention contain total organic chlorine amounts of up to about 0.1% based on the weight of the aminopolyamide-epichlorohydrin acid salt resin while providing wet tensile values in treated pulp about equal to those obtainable from commercially available aminopolyamide-epichlorohydrin acid salt resin compositions. Typical commerically available compositions contain about 10% total organic chlorine based on the weight of the aminopolyamide-epichlorohydrin acid salt resin. The wet strength resin compositions according to the invention contain total organic chlorine amounts which are lower than those of commercially available wet strength compositions by at least about two orders of magnitude. The reaction parameters of E/N ratio, epichlorohydrin (ECH) addition time and temperature, epichlorohydrin reaction time and temperature, product viscosity, relative performance (expressed as a wet tensile ratio) and % total organic chlorine for wet strength resin compositions according to the invention and the process according to the invention are listed in Table I. The relative performance which is the ratio of the wet tensile of a sheet treated with a particular wet strength resin composition according to the invention and the wet tensile of a sheet treated with a commercial wet strength resin composition (Fibrabond 33, Henkel Corp.) which contains about 10% total organic chlorine based on the weight of the aminopolyamide-epichlorohydrin acid salt resin.

The wet strength resin compositions according to the invention are comprised of from about 1% to about 60% by weight of an aminopolyamide-epichlorohydrin acid salt resin, up to about 0.1% by weight total organic chlorine based on the weight of the resin, and the remainder water. A preferred wet strength resin composition is comprised of about 10% by weight of an aminopolyamide-epichlorohydrin acid salt resin, up to about 0.1% by weight total organic chlorine based on the weight of said resin, and the remainder water. A particularly preferred wet strength resin composition is comprised of water, about 35% by weight of an aminopolyamide-epichlorohydrin acid salt resin, up to about 0.1% by weight total organic chlorine based on the weight of said resin, and the remainder water. Another particularly preferred wet strength resin composition is comprised of water, about 45% by weight of an aminopolyamide-epichlorohydrin acid salt resin, up to about 0.1% by weight total organic chlorine based on the weight of said resin, and the remainder water.

Another aspect of the present invention provides a process for producing a wet strength resin comprising the steps of: (a) providing an aqueous solution of an aminopolyamide resin; (b) adding epichlorohydrin to said solution over a period of from about 10 minutes to about 200 minutes and at a temperature in the range of from about 5° C. to about 20° C. to form a reaction mixture having an E/N ratio of from about 0.6 to about 0.8; (c) maintaining the temperature of said reaction mixture in a range of from about 15° C. to about 25° C. until all of the epichlorohydrin has reacted; and (d) adjusting the pH of said reaction mixture to a value of less than about 7.0 to produce a wet strength resin composition comprised of an aqueous solution of an aminopolyamide-epichlorohydrin acid salt resin wherein said composition has a total organic chlorine of less than about 0.1% by weight of said resin. The E/N ratio is defined by Equation I as $$\frac{\text{moles epichlorohydrin}}{\text{amine equivalents}} \qquad \text{Eq. I}$$

where the amine equivalents is defined by Equation II as $$\frac{\text{wt. of aminopolyamide sol'n} \times \% \text{ solids as decimal} \times TA}{56110} \quad \text{Eq. II}$$

and TA, which is total alkalinity, is defined by Equation III as $$\frac{\text{volume (ml)} \times \text{normality of stnd. acid} \times 56.11}{\text{wt. of aminpolyamide sol'n} \times \% \text{ solids as decimal}} \quad \text{Eq. III}$$

The total alkalinity of a typical aminopolyamide is in the range of from about 270 to about 280 mg/g of KOH on a solids basis. The aminopolyamide resin can be made by reacting a dicarboxylic acid with an a polyamine which is a compound having at least two amine functionalities such as a simple diamine as ethylene diamine or more than two amine functionalities such as diethylenetriamine, triethylenetetramine, tetraethylenepentamine, and bis-hexamethylenetriamine and the like. Any dicarboxylic acid can be used in the process according to the invention such as malonic acid, succinic acid, glutaric acid, adipic acid, maleic acid, itaconic acid, fumaric acid, phthalic acid, isophthalic acid, terephthalic acid, and the like. An aminopolyamide can also be made by reacting a dicarboxylic acid ester such as diesters of any of the above dicarboxylic acids with a polyamine. While any water soluble, water-miscible, or water-dispersable aminopolyamide can be used in the process according to the invention, aminopolyamide resins wherein the dicarboxylic acid component contains from 4 to 6 carbon atoms and the diamine component contains at least three amine functionalities are preferred.

In step (a) of the process according to the invention, the aminopolyamide resin is dissolved in water to make a solution to which epichlorohydrin is added. The concentration of the aminopolyamide in the water is not critical as long as the combined reaction solids content of aminopolyamide and epichlorohydrin present after step (b) are in the range of from about 5% to about 60% by weight. The preferred % aminopolyamide solids in step (a) of the process is from about 29% to about 39% by weight. The amount of epichlorohydrin to be added in step (b) of the process is calculated by substituting the numerical value for the amine equivalents as calculated by Equation II into Equation I, setting the E/N value equal to about 0.7, and solving the equation for moles of epichlorohydrin. The epichlorohydrin is added to the aminopolyamide solution neat over a period of from about 10 minutes to about 200 minutes preferably from about 60 to about 180 minutes and at a temperature in the range of from about 5° C. to about 20° C. preferably from about 10° C. to about 15° C. In step (c) the temperature of the reaction mixture is then maintained in a range of from about 15° C. to about 25° C. until all of the epichlorohydrin has reacted. In step (b) the reaction mixture will exotherm during and immediately after the epichlorohydrin addition. The exotherm is controlled so that the temperature of the reaction mixture falls in the range of from about 15° C. to about 25° C. and preferably from about 18° C. to about 22° C. After the exotherm, the temperature of the reaction mixture is maintained until all of the epichlorohydrin has reacted. This is the epichlorohydrin reaction time referred to in Table I and can be determined by analysis of the reaction mixture for total organic chlorine as described in Example 14. All of the epichlorohydrin has reacted when the total organic chlorine is less than about 1000 ppm (0.1% by weight) based on reaction solids. The epichlorohydrin reaction time can also be determined from viscosity measurements of the reaction mixture by means of a Brookfield viscometer using a #2 spindle at 30 r.p.m. at 25° C. When step (c) of the process is carried out at a preferred total solids content of about 45%, the epichlorohydrin reaction temperature is maintained until the Brookfield viscosity of the reaction mixture falls within the range of from about 500 to about 650 cps. In another preferred embodiment, when the total solids content of step (c) is 40%, the epichlorohydrin reaction temperature is maintained until the Brookfield viscosity of the reaction mixture falls within the range of from about 350 to about 400 cps. In yet another preferred embodiment, when the total solids content of step (c) is 35%, the epichlorohydrin reaction temperature is maintained until the Brookfield viscosity of the reaction mixture falls within the range of from about 200 to about 250 cps. The product formed in step (c) is an epichlorohydrin-aminopolyamide resin. After the temperature has been held in the range disclosed above, the reaction is stopped by adjusting the pH of the reaction mixture to a value of less than about 7. The addition of an amount of water to reach a desired final % solids level followed by pH adjustment can also stop the reaction. The preferred final solids content is from about 35% to about 45% by weight of solution. The pH of the reaction mixture is always adjusted by acidification regardless of whether water is or is not added to stop the reaction. The acidification can be accomplished by any means known to those of ordinary skill in the art. For example, a gaseous acid such as anhydrous hydrogen chloride can be introduced into the aqueous reaction mixture or an aqueous acid solution can be added. Preferably an aqueous acid solution is used to adjust the pH to a value of less than about 7.0 such as hydrochloric acid, sulfuric acid, phosphoric acid, acetic acid, propionic acid, or benzoic acid. The preferred aqueous acid solution is hydrochloric acid. While any pH value of less than about 7.0 can be achieved, the preferred value is in the range of from about 2 to about 4. The process according to the invention produces a wet strength resin composition comprising an aminopolyamide-epichlorohydrin acid salt resin and a total organic chlorine of less than about 0.1% by weight of the aminopolyamide-epichlorohydrin acid salt resin. The total organic chlorine is determined by the method described in Example 14.

The process according to the invention produces unexpectedly low levels of total organic chlorine in a wet strength resin which performs at least as well as resins which have one to two orders of magnitude more total organic chlorine because the epichlorohydrin reaction is carried out at relatively low temperatures and a relatively low E/N ratio. Examples 2-8 are resins prepared by the process according to the invention which produces the combined effects of low total organic chlorine and wet tensile development equal to resins containing about 2 orders of magnitude more total organic chlorine. Examples 9-12 are resins prepared by the methods according to the prior art and show the effects of elevated epichlorohydrin reaction temperatures at comparable E/N ratios for resins prepared according to the process of the invention. Conventional wisdom dictates that optimum wet strength performance and minimum total organic chlorine levels are favored by optimizing the epichlorohydrin reaction which is in turn favored by reaction temperatures greater than room temperature and E/N ratios approaching 1.0.

The present invention also provides cellulosic fibrous webs comprising a wet strengthening effective amount of an aminopolyamide-epichlorohydrin acid salt resin and less than about 0.1% of total organic chlorine by weight of said aminopolyamide-epichlorohydrin acid salt resin. A wet strengthening effective amount of an aminopolyamide-epichlorohydrin acid salt resin is any amount required to reach a desired wet strength as determined by wet tensile measurements. Different applications will require different amounts of wet tensile and hence different amounts of wet strength resin composition containing an aminopolyamide-epichlorohydrin acid salt resin. The relationship between the amount of wet strength resin composition added to a cellulosic fibrous web and the wet tensile produced thereform is dependent upon a number of factors such as the nature of the pulp fibers and the method of application and is readily determinable by one of ordinary skill in the art. The wet strength resin compositions according to the invention are normally applied to cellulosic pulp fibers at dosage level of from about 1 to about 20 pounds of dry wet strength resin per ton of fiber to produce wet strengthened webs. The wet strength resin compositions according to the invention can be applied to cellulosic pulp fibers by any method known to those of ordinary skill in the art such as by spraying, dipping or coating a pre-formed sheet or in the wet end of a paper machine since the aminopolyamide-epichlorohydrin acid salt resins in the wet strength resin compositions are substantive to cellulose pulp fibers. The preferred amount of dry wet strength resin per ton of fiber is in the range of from about 4 to about 12 lbs pounds per ton. The following examples will serve to illustrate but not limit the invention.

EXAMPLE 1

Preparation of an Aminopolyamide Resin

To a resin reactor was charged 269 grams of dibasic acid ester mixture comprised of 65% dimethyl glutarate and 35% dimethyl adipate and 170 grams of diethylene triamine. Stirring and nitrogen sparge were started and the contents of the reactor were heated to 150° C. This temperature was maintained until the start of methanol reflux. The reflux was allowed to continue until the reaction temperature reached 85° C. at which time the methanol was distilled off. The reaction temperature rose to 150° C. during the distillation which afforded 109 grams of methanol. A 32.9% solids aminopolyamide resin solution was made by dissolving the reaction product in 670 grams of water. The total alkalinity was determined to be 274.8 mg KOH/g on a solids basis.

EXAMPLES 2-12

Examples 2-8 describe the preparation of wet strength resin compositions according to the invention and prepared according to the process of according to the invention. Examples 9-12 describe the preparation of resin compositions using reaction parameters outside the scope of the process according to the invention. The entries in Table I list the various reaction parameters, wet strength performance, and total organic chlorine of compositions corresponding to examples 2-12. Examples 3-8 were prepared exactly like the procedure of Example 2.

EXAMPLE 2

Preparation of Wet Strength Resins Compositions

To a round bottom flask were charged 171 grams of a 48.0% solids aminopolyamide resin solution having a total alkalinity based on solids content (TA) of 274.8 mg KOH/g and 38 grams of water. Gentle stirring was applied and the contents of the flask were cooled to about 15° C. (ECH addition temperature) at which time about 26 grams of epichlorohydrin were added over 3 hours. After completion of the epichlorohydrin addition, the contents of the reactor were allowed to exotherm to a temperature of about 20° C. The reaction mass was held at this temperature for 12.5 hours (ECH reaction temperature and time). The viscosity at this point (Final Visc.) was 602 cps. The reaction was stopped by adjusting the pH of the solution to 2.0 with 37% hydrochloric acid. The resin solution contained 45.6% solids and 0.044% total organic chlorides based on the resin solids (% total Cl) as determined by extraction-G.C. method. (Example 14)

EXAMPLE 13

Performance Testing of Wet Strength Resin Compositions

1. Stock Preparation

Kraft softwood lapboard (Bowater) was beaten in a large capacity Waring Blender at 4.1% consistency for 10 minutes at 15,500 r.p.m. and then further diluted to 0.27% consistency. The drainage of the diluted stock was measured at 110-120 ml by "30 Second Britt Drainage" method using a 4" circular 70 mesh screen with the Mark IV Dynamic Handsheet Mold/Paper Chemistry Jar Assembly.

2. Handsheet Preparation

Blank handsheets were prepared according to the handsheet preparation method outlined in the Mark IV Dynamic Handsheet Mold/Paper Chemistry Jar Assembly operating manual. Treated handsheets were prepared by the same method except a dosage of 8 dry pounds wet strength resin per ton of dry pulp was manually added to the dispersed stock slurry and the furnish was mixed at 750 r.p.m. for 55 seconds. Handsheets were blotted dry between felt sheets and pressed with a rolling pin in back and forth and diagonal directions. Pressed sheets were placed between drying rings and conditioned overnight at 50% humidity and 70° C. as per instructions in the Mark IV Dynamic Handsheet Mold/Paper Chemistry Jar Assembly operating manual.

3. Wet Tensile Determination

Tensile strips measuring 1" by 4" were cut from treated handsheets and soaked for 1 hour in water at 25° C. Tensile strengths were determined on an Instron Tensile Tester using a 10 lb load cell. The wet tensile ratio of Table I is defined as the ratio of the wet tensile of a sheet treated with a wet strength resin composition according to the invention to the ratio of the wet tensile of commercial product B which is Fibrabond 33, a product of Henkel Corporation, Ambler, Pa. Product A in Table I is Kymene 557H, a product of Hercules, Wilmington, Del.

TABLE I

| Resin | E/N | % Rx Solids | ECH Addition Time (hrs) | ECH Addition Temp (°C.) | ECH Reaction Time (hrs) | ECH Reaction Temp (°C.) | Final Visc. (cps) | Wet Tensile Ratio | % Total Cl |
|---|---|---|---|---|---|---|---|---|---|
| Ex. 2 | 0.7 | 45 | 3.0 | 15 | 12.5 | 20 | 602 | 0.96 | 0.044 |
| Ex. 3 | 0.7 | 40 | 3.0 | 15 | 18.25 | 15 | 347 | 1.10 | 0.048 |
| Ex. 4 | 0.7 | 40 | 1.0 | 10 | 14.0 | 20 | 375 | 0.95 | 0.050 |
| Ex. 5 | 0.7 | 35 | 3.0 | 15 | 14.5 | 20 | 198 | 1.01 | 0.056 |
| Ex. 6 | 0.7 | 45 | 3.0 | 10 | 11.75 | 20 | 640 | 0.97 | 0.037 |
| Ex. 7 | 0.7 | 45 | 3.0 | 10 | 10.0 | 22.5 | 670 | 0.93 | 0.038 |
| Ex. 8 | 0.7 | 45 | 1.0 | 10 | 7.5 | 25 | 660 | 1.01 | 0.040 |
| Ex. 9 | 1.5 | 46 | 0.61 | 10 | 8.0 | 50 | 2250 | 0.88 | 9.8 |
| Ex. 10 | 0.7 | 35 | 0.5 | 10 | 4.0 | 30 | 210 | 1.03 | 0.242 |
| Ex. 11 | 0.5 | 35 | 0.5 | 10 | 2.75 | 30 | 200 | 0.81 | 0.143 |
| Ex. 12 | 0.6 | 35 | 0.5 | 10 | 3.5 | 30 | 218 | 0.92 | 0.143 |
| Resin A | | | | | | | | 0.92 | 13.8 |
| Resin B | | | | | | | | 1.00 | 9.7 |

The dosage level for all sheets was 8 lbs resin/ton pulp

EXAMPLE 14

Total Organic Chlorine Analysis Extraction-G.C. Method

1. Sample Preparation

Approximately 5.000 g of the wet strength resin composition according to the invention comprised of an aminopolyamide-epichlorohydrin acid salt resin was added into a 40 ml screw-top centrifuge tube. About 25 ml of ethyl acetate was added and the contents of the centrifuge tube were shaken thoroughly until the resin solution was dispersed. The contents of the tube were allowed to stand for 5 min. and then shaken again. The contents of the tube were centrifuged at high speed for 10 min. or until the upper solvent layer was clear. A portion of the supernatant solution was taken for G.C. injection.

2. Preparation of Standards

Stock solutions of approximately 1000 ppm of epichlorohydrin, 1,3-dichloro-2-propanol, and 3-chloro-1,2-propanediol were prepared in ethyl acetate on a weight to weight basis. These were further diluted volumetrically to lower levels prior to use. The second dilution depended upon the anticipated concentrations of the level of organic chlorides in the aminopolyamide-epichlorohydrin resin solutions.

3. Gas Chromatographic Conditions

Detector: electron capture
Column: 0.54 mm capillary column, polyethylene glycol stationary phase, 2.5 micron film thickness.
Septum purge: 0.5 minute
Carrier gas: He, 10 psi head pressure
Makeup gas: Nitrogen at 40 psi Because of the differences between the retention times of epichlorohydrin and chloropropanediol, optimum integration of all peaks was achieved when the analysis was done in two steps. The best values for 1,3-dichloro-2-propanol, and 3-chloro-1,2-propanediol resulted from an isothermal run at 190° C. and for epichlorohydrin, a ramped program from 120° C.-190° C. was used.

4. Calculations

The concentration of organic chloride in the extract was calculated from the formula:

$$\text{Conc. of Extract} = \frac{\text{Conc. of Stnd.}}{\text{Response of Stnd.}} \times \text{Response of Extract}$$

The resulting concentration in the extract was multiplied by the ratio of ethyl acetate to aminopolyamide-epichlorohydrin samples used in the extraction to give the concentration of organic chloride in the original sample.

What is claimed is:

1. A wet strength resin composition comprising from about 1% to about 60% by weight of an aminopolyamide-epichlorohydrin acid salt resin, up to about 0.1% by weight total organic chlorine based on the weight of said resin, and the remainder water.

2. The wet strength resin composition of claim 1 wherein the amount of said aminopolyamide-epichlorohydrin acid salt resin in said composition is about 10% by weight.

3. The wet strength resin composition of claim 1 wherein the amount of said aminopolyamide-epichlorohydrin acid salt resin in said composition is about 35% by weight.

4. The wet strength resin composition of claim 1 wherein the amount of said aminopolyamide-epichlorohydrin acid salt resin in said composition is about 45%.

5. A process for producing a wet strength resin composition according to claim 1 comprising the steps of:
   (a) providing an aqueous solution of an aminopolyamide resin;
   (b) adding epichlorohydrin to said solution over a period of from about 10 minutes to about 200 minutes and at a temperature range of from about 5° C. to about 20° C. to form a reaction mixture having an E/N ratio of from about 0.6 to about 0.8;
   (c) maintaining the temperature of said reaction mixture in a range of from about 15° C. to about 25° C. until all of the epichlorohydrin has reacted; and
   (d) adjusting the pH of said reaction mixture to a value of up to about 7.0 to produce a wet strength resin composition comprised of an aqueous solution of an aminopolyamide-epichlorohydrin acid salt resin wherein said composition has a total organic chlorine of up to about 0.1% by weight of said resin.

6. The process of claim 5 wherein the amount of aminopolyamide resin in said aqueous solution is from about 10% to about 45% by weight.

7. The process of claim 6 wherein the amount of aminopolyamide resin in said aqueous solution is from about 35% to about 45% by weight.

8. The process of claim 6 wherein the amount of aminopolyamide resin in said aqueous solution is about 45% by weight.

9. The process of claim 5 wherein the epichlorohydrin is added over a period of from about 60 minutes to about 180 minutes in step (b).

10. The process of claim 5 wherein said temperature range in step (b) is from about 10° C. to about 15° C.

11. The process of claim 5 wherein said temperature range in step (c) is from about 18° C. to about 22° C.

12. The process of claim 5 wherein said pH is adjusted with an aqueous acid solution.

13. The process of claim 12 wherein said aqueous acid solution is hydrochloric acid.

14. The process of claim 5 wherein said pH is from about 2.0 to about 4.0.

15. The process of claim 5 wherein the temperature in step (c) is maintained in a range of from about 15° C. to about 25° C. until the viscosity of said reaction mixture is equal to from about 500 to about 650 cps when the solids content of said reaction mixture is equal to about 45% by weight.

16. The process of claim 5 wherein the temperature in step (c) is maintained in a range of from about 15° C. to about 25° C. until the viscosity of said reaction mixture is equal to from about 350 to about 400 cps when the solids content of said reaction mixture is equal to about 40% by weight.

17. The process of claim 5 wherein the temperature in step (c) is maintained in a range of from about 15° C. to about 25° C. until the viscosity of said reaction mixture is equal to from about 200 to about 250 cps when the solids content of said reaction mixture is equal to about 35% by weight.

18. A fibrous web comprising a wet strengthening effective amount of an aminopolyamide-epichlorohydrin acid salt resin and up to about 0.1% of total organic chlorine by weight of said aminopolyamide-epichlorohydrin acid salt resin.

19. The cellulosic fibrous web of claim 18 wherein said aminopolyamide-epichlorohydrin acid salt resin is present in an amount equal to from about 1 to about 20 lbs pounds per ton of the fiber in said web.

20. The cellulosic fibrous web of claim 19 wherein said aminopolyamide-epichlorohydrin acid salt resin is present in an amount equal to from about 4 to about 12 lbs pounds per ton of the fiber in said web.

* * * * *